March 20, 1962 R. B. WALLACE 3,025,540
APPARATUS FOR RESTORING DAMAGED THREADS
Filed May 11, 1959
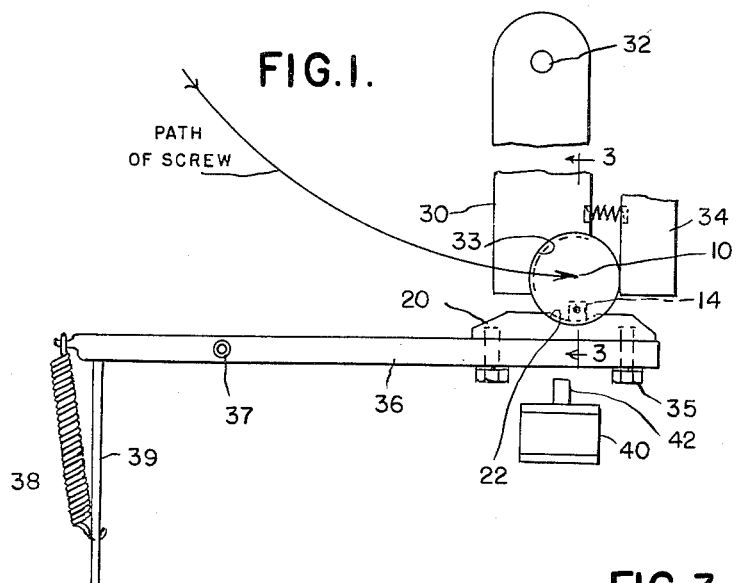
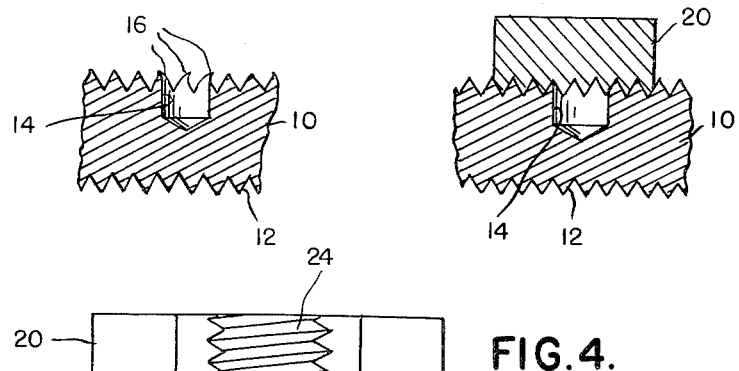
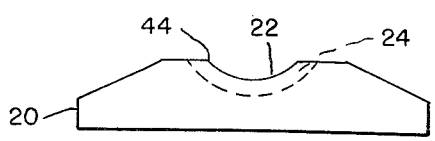
INVENTOR.
RICHARD B. WALLACE
BY Whittemore
Hulbert & Belknap
ATTORNEYS

United States Patent Office 3,025,540
Patented Mar. 20, 1962

3,025,540
APPARATUS FOR RESTORING DAMAGED THREADS
Richard B. Wallace, Birmingham, Mich., assignor to The Oakland Corporation, Birmingham, Mich., a corporation of Michigan
Filed May 11, 1959, Ser. No. 812,221
5 Claims. (Cl. 10—1)

The present invention relates to a thread hammer.

It is an object of the present invention to provide mechanism of the character described designed to facilitate the correcting and re-forming of damaged threads on a threaded member.

More specifically, it is an object of the present invention to provide mechanism for reshaping and re-forming damaged threads on a threaded member which comprises a block having a shallow concave recess provided with transversely extending thread portions shaped to be conjugate to threads on a threaded member.

It is a further object of the present invention to provide mechanism as described in the preceding paragraph in conjunction with means for supporting the threaded member and block for movement toward and away from each other and for relative movement in a direction parallel to the axis of the threaded member to permit the threads to move into fully interfitting relation.

It is a further object of the present invention to provide apparatus as described in the preceding paragraph in combination with an impact device to strike the thread hammer so as to impart a sharp thread reshaping and re-forming impulse to the material of the threaded member.

Other objects and features of the invention will become apparent as the description proceeds, especially when taken in conjunction with the accompanying drawings, illustrating a preferred embodiment of the invention, wherein:

FIGURE 1 is a fragmentary plan view of the mechanism.

FIGURE 2 is a fragmentary sectional view through a threaded member illustrating damaged thread portions thereon.

FIGURE 3 is a fragmentary sectional view on the line 3—3, FIGURE 1.

FIGURE 4 is a front elevational view of the thread hammer.

FIGURE 5 is a side elevational view of the thread hammer.

In certain operations a threaded member such for example as a screw or bolt, has an operation performed on it subsequent to threading and this operation in many cases results in distortion, displacement, and damage to portions of the thread of the member. A typical example of such an operation is the drilling of a hole into a previously threaded member by an ordinary twist drill. This operation inherently results in some distortion and damage to the portions of the threads at the edges of the hole. In FIGURE 2 there is shown a portion of a threaded member 10 such for example as a bolt, having threads 12 formed thereon and provided with a drilled recess 14. This work piece by way of illustration, may be intended for modification by the insertion of a nylon plug into the recess 14.

No matter with what care the recess 14 is drilled nor how sharp the twist drill is, the crests of the thread as indicated at 16 are displaced, bent over, and otherwise damaged. The burrs thus provided on the damaged threads, when the screw is engaged with a mating thread, create galling drag and damage to the mating thread.

In accordance with the present invention these threads may be reshaped or re-formed by the use of the thread hammer illustrated in FIGURES 4 and 5. The thread hammer comprises a block 20 having at one side a relatively shallow concave recess 22, the surface of which is provided with parallel generally transversely extending portions 24 of threads. These threads are conjugate to the threads on the periphery of the threaded member 10 for which the thread hammer 20 is designed.

The basic operation which results in reforming and repairing damaged threads is to provide a sharp impact between the thread hammer and the damaged threads of the threaded member. However, it is of course essential that this impact be delivered in an accurately located position as otherwise additional damage to the threaded member would result. Accordingly, the operation is carried out by first locating the thread hammer against the side of the threaded member with the threads of the members as nearly as possible in full and accurate locating contact. After this proper location between the parts has taken place an impulse is delivered to the thread hammer, preferably by impacting the side of the thread hammer opposite to its concave recess. It will of course be apparent that the foregoing operation could be carried out by the use of a thread hammer provided with a handle and the impact could be delivered by an ordinary hammer. However, the present invention is intended primarily for use in a machine in which the threaded members are gripped by support mechanism and advanced sequentially in a circular path past a number of stations at which different operations are performed on the threaded member. Thus for example, the cylindrical recess 14 may be drilled into the threaded member at the first station, the drilled recess may be cleaned out by an air blast at a second station, and a nylon plug inserted in the recess at a third station. In accordance with the present invention the thread hammer mechanism constitutes an additional station located for operation on the threaded member subsequent to the drilling operation.

Referring now to FIGURES 1 and 3 the threaded member 10 is shown as carried by a support 30 which is diagrammatically illustrated as having a pivot mounting 32. The work piece or threaded member 10 is clamped in a recess 3 of the support 30 by a clamping element 34 which is resiliently urged against the opposite side of the threaded member 10. It will be observed that the support 30 and clamp 34 leave one side of the threaded member 10 exposed, and as seen in FIGURE 1 the threaded member 10 has previously been provided with the drilled recess 14.

The thread hammer 20 is shown as connected by screws 35 to a tool support in the form of a pivot arm 36 mounted for swinging movement on a fixed pivot 37. A tension spring 38 is connected between one end of the arm 36 and a fixed stop 39 which limits movement of the thread hammer 20. Associated with the support arm 36 is an impact device indicated generally at 40 which may comprise a solenoid actuated impacter including an impact element 42 engageable with the arm 36 to apply an impulse to the thread hammer 20 toward the threaded member 10.

Reference was previously made to the fact that it is imperative in the present instance to insure proper registration between the threads of the threaded member and the thread portions of the thread hammer. The proper relationship is illustrated in FIGURE 3 where it will be observed that the thread portions are in substantially exact alignment. If the threads are out of alignment when the thread hammer is impacted the operation may cause more damage than correction to the threads of the threaded member. For this reason means are provided to permit substantially free relative movement between the thread hammer 20 and the threaded member 10 in a direction parallel to the axis of the threaded member 10. This means may be the result of providing for longitudinal sliding between the fixed pivot 37 and the pivoted support arm 36.

Referring now to FIGURES 2 and 5 it will be observed that movement of the threaded member into operating position adjacent the thread hammer 20 is along a circular arc. As the threaded member engages the thread hammer 20, the support arm 36 is rocked clockwise as seen in FIGURE 2 against the action of the spring 38. The initial contact between threads on the threaded member and the thread portions in the recess 22 of the thread hammer takes place at a corner portion 44 of the thread hammer, as seen in FIGURE 5. Moreover, it will be apparent that as the threads on the work piece are helical, movement of these helically inclined threads across the threaded corner 44 is equivalent to providing a limited relative motion between the threaded member and thread hammer parallel to the axis of the threaded member. When the portions of the threads of the threaded member engage sufficiently into the bottoms of the thread portions of the thread hammer, substantial forces, depending in part upon the strength of the spring 38, opposed movement of the thread portions out of registration. These forces are sufficient to maintain the threaded portions in full registration, accompanied if necessary by displacement of the pivot arm 36 parallel to the axis of its pivot mounting 37.

When the support 30 has moved to the position illustrated in FIGURE 1, the thread portions of the thread hammer are in accurate registration and substantial contact (so far as permitted by the burrs 16) with the adjacent thread portions of the threaded member 10. At this time a sharp impact is applied to the thread hammer and will result in reshaping and re-forming the threads with the complete elimination of the burrs 16.

The impacting device 40 may be pneumatic, hydraulic, electric, or mechanical. It has been found that surprisingly light striking loads will completely re-form damaged threads and eliminate burrs from the threaded member.

It will of course be apparent that the threaded member 10 has been clamped, for drilling or other forming operation on the recess 14, and hence it would be impractical to require rotation of the threaded member for rolling or chasing the damaged threads or removal of burrs therefrom. Furthermore, since the original position of the recess 14 must be maintained for subsequent operations, other known types of deburring operations which would require in rotation of the threaded member are not possible. The present support and thread correcting operation creates no rotative effect on the threaded member 10.

Inasmuch as the drilled recess 14 requires no particular registration with the threads, it is apparent that the thread hammer may be required to assume any position (parallel to the axis of its pivot support 37) over a range of movement determined by the pitch of the thread on the threaded member.

The thread correcting operation as disclosed herein is carried out with extreme rapidity requiring only the quick impacting of the thread hammer. This means that the operation may be performed in an automatic machine without delaying or extending the cycle. Moreover, since the operation is the result of impact rather than steady pressure, the device may be made small in comparison to any conceivable pressure roll device, wire brush, or the like.

Finally, an important advantage of the present operation is that the re-forming of the threads eliminates the burrs without removing them. Consequently, no burrs remain in the threads of a part treated as disclosed herein.

The drawings and the foregoing specification constitute a description of the improved thread hammer in such full, clear, concise and exact terms as to enable any person skilled in the art to practice the invention, the scope of which is indicated by the appended claims.

What I claim as my invention is:

1. Thread repair apparatus comprising a work support for supporting a threaded member with a side of said member exposed, a thread hammer comprising a block having a shallow recess having thread portions extending across the recess, a tool support on which said hammer is mounted, means mounting said support for substantially free relative movement axially of a threaded part carried by said work support and for relative approach and separation, resilient means connected to said tool support to urge it in a direction to press said thread hammer into engagement with the side of said threaded member, and means for impacting the hammer to drive it into thread reforming contact with a threaded member engaged therewith.

2. In thread repair apparatus comprising a work support for supporting a threaded member with a side of said member exposed, a thread hammer comprising a block having a shallow recess having thread portions extending across the recess, a tool support on which said hammer is mounted, means mounting said work support for movement in an arcuate path perpendicular to the axis of a threaded member carried thereby, and means mounting said tool support adjacent the path of movement of said work support for substantially free movement parallel to the axis of a threaded member carried by said work support to provide correct interfitting engagement between the threads and for movement of said thread hammer toward and away from the work support when it is in position adjacent said tool support.

3. Thread repair apparatus comprising a work support for supporting a threaded member with a side of said member exposed, a thread hammer comprising a block having a shallow recess having thread portions extending across the recess, a tool support on which said hammer is mounted, means mounting said work support for movement in an arcuate path perpendicular to the axis of a threaded member carried thereby, means mounting said tool support adjacent the path of movement of said work support for substantially free movement parallel to the axis of a threaded member carried by said work support to provide correct interfitting engagement between the threads and for movement of said thread hammer toward and away from the work support when it is in position adjacent said tool support, and resilient means connected to said tool support and urging said tool support in a direction to press said thread hammer against the side of the threaded member carried by said work support.

4. Thread repair apparatus comprising a work support for supporting a threaded member with a side of said member exposed, a thread hammer comprising a block having a shallow recess having thread portions extending across the recess, a tool support on which said hammer is mounted, means mounting said work support for movement in an arcuate path perpendicular to the axis of a threaded member carried thereby, means mounting said tool support adjacent the path of movement of said work support for substantially free movement parallel to the axis of a threaded member carried by said work support to provide correct interfitting engagement between the threads and for movement toward and away from the work support when it is in position adjacent said tool support, resilient means connected to said tool support for moving said tool support in a direction to press said thread hammer in thread registering contact with the exposed side of said threaded member, and impact mechanism to strike said hammer to re-form damaged threads on a threaded member while engaged therewith.

5. Thread repair apparatus comprising a work support for supporting a threaded member with a side of said member exposed, a thread hammer comprising a block having a shallow recess having thread portions extending across the recess, a tool support on which said hammer is mounted, means mounting said work support for movement along a path perpendicular to the axis of a threaded member carried thereby, means mounting said tool supportt adjacent the path of movement of said work support for substantially free movement parallel to the axis of a threaded member carried by said work support to provide correct interfitting engagement between the threads and for movement toward and away from the work support when it is in position adjacent said tool support, resilient means connected to said tool support for moving said tool support in a direction to press said thread hammer in thread registering contact with the exposed side of said threaded member, and impact mechanism to strike said hammer to re-form damaged threads on a threaded member while engaged therewith.

References Cited in the file of this patent
UNITED STATES PATENTS

| | | |
|---|---|---|
| 1,683,114 | Williamson | Sept. 4, 1928 |
| 2,811,730 | Vegren | Nov. 5, 1957 |